United States Patent
Wei

(10) Patent No.: US 9,894,279 B2
(45) Date of Patent: Feb. 13, 2018

(54) HANDHELD TRIAXIAL HOLDER WITH A CONTROL STICK

(71) Applicant: Guilin Feiyu Technology Corporation Ltd., Guilin, Guangxi (CN)

(72) Inventor: Chengyun Wei, Guangxi (CN)

(73) Assignee: GUILIN FEIYU TECHNOLOGY CORPORATION LTD., Guilin (CN)

( * ) Notice: Subject to any disclaimer, the term of this patent is extended or adjusted under 35 U.S.C. 154(b) by 0 days.

(21) Appl. No.: 15/176,199

(22) Filed: Jun. 8, 2016

(65) Prior Publication Data

US 2017/0054887 A1    Feb. 23, 2017

(30) Foreign Application Priority Data

Aug. 18, 2015  (CN) ............... 2015 2 0621245 U

(51) Int. Cl.
  *H04N 5/232*  (2006.01)
  *G02B 27/64*  (2006.01)

(52) U.S. Cl.
  CPC ......... *H04N 5/2328* (2013.01); *G02B 27/644* (2013.01); *H04N 5/23216* (2013.01)

(58) Field of Classification Search
  CPC . H04N 5/2328; H04N 5/23216; G02B 27/644
  See application file for complete search history.

(56) References Cited

U.S. PATENT DOCUMENTS

| | | | |
|---|---|---|---|
| 7,209,176 B2 * | 4/2007 | Chapman | F16M 11/10 248/187.1 |
| 9,473,608 B1 * | 10/2016 | Sherman | H04M 1/21 |
| 2016/0246162 A1 * | 8/2016 | Niemeyer | F16M 11/18 |

* cited by examiner

*Primary Examiner* — Padma Haliyur

(57) ABSTRACT

A handheld triaxial holder with a control stick comprises a handheld part, a fixing device, three motors orthogonally arranged in space, a control stick which is attached to the handheld part and provided with a navigation key of the control stick and a function button. The motor is provided with a slip ring inside its hollow bearing, so that the control line passing through it would not rotate along with it and three motors may freely rotate 360 degrees. The handheld triaxial holder with a control stick has a small size to carry, and is applicable for small shooting equipment. The motors are capable of rotating 360 degrees and facilitate multi-angle shooting. The handheld triaxial holder is provided with a control stick for controlling its rotation movement, and has a good effect on quickly stabilizing shooting equipment during moving shooting. It may also output videos and charge the shooting equipment.

3 Claims, 1 Drawing Sheet

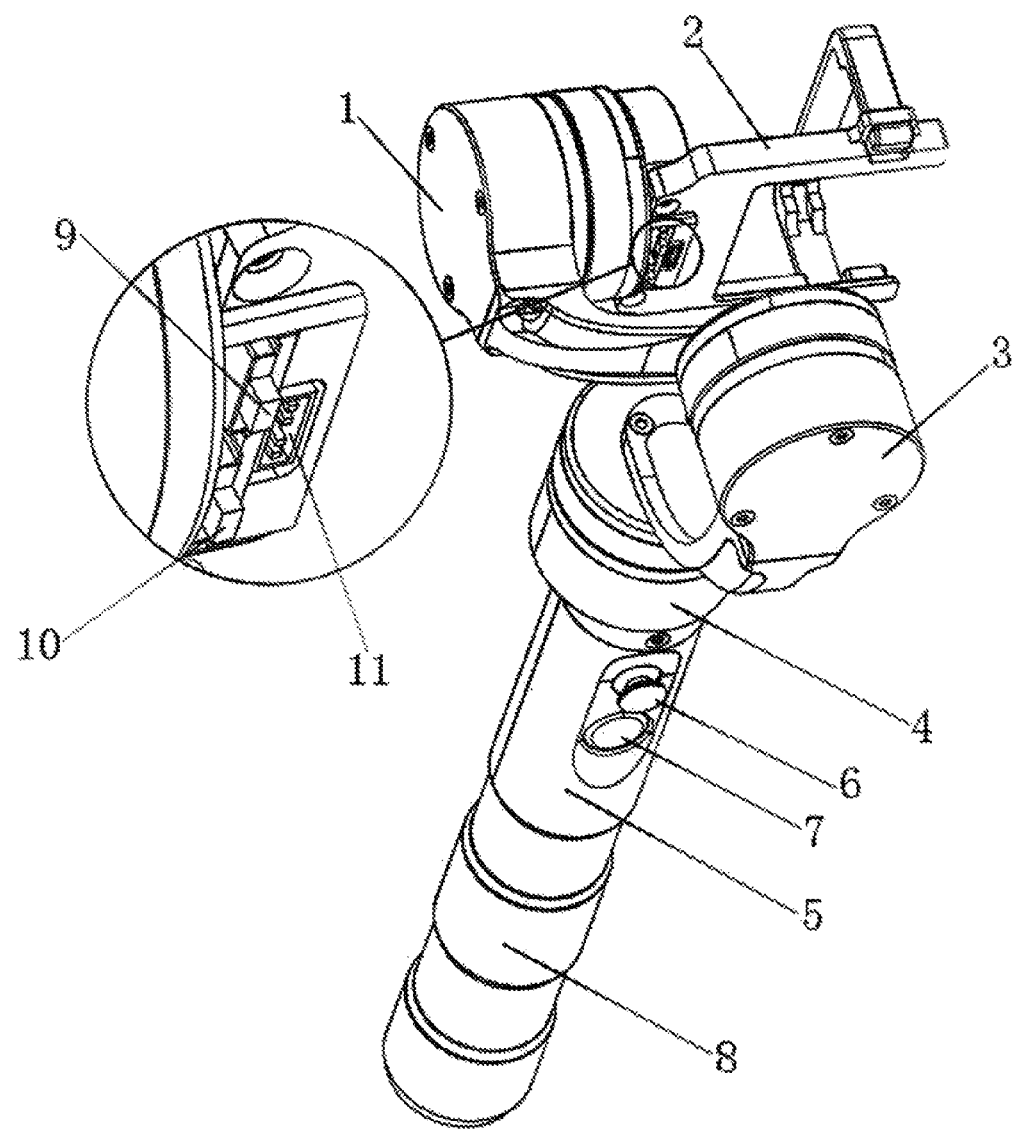

HANDHELD TRIAXIAL HOLDER WITH A CONTROL STICK

CROSS-REFERENCE TO RELATED APPLICATIONS

The present application claims the benefit of Chinese Utility Model Application No. 201520621245.6 filed on Aug. 18, 2015, the contents of which are hereby incorporated by reference.

FIELD OF THE INVENTION

The present invention relates to a device for stabilizing shooting equipment such as video camera and photo camera, more particular to a handheld triaxial holder with a control stick.

BACKGROUND OF THE INVENTION

The existing holders are mainly used for professional-grade video cameras or photo cameras. These holders usually have huge sizes and are too heavy to carry. Most of these holders may only rotate about three axes and do not have good stabilizing effects. Due to lacking of feedback for the pose of the video camera or photo camera, these holders cannot provide a real-time stabilizing compensation during moving shooting, and they have problems of unstabilized mobile platform, video camera or photo camera during moving shooting and may be used only in a stationary position.

SUMMARY OF THE INVENTION

Against the existing deficiencies, the present invention aims to provide a handheld triaxial holder with a control stick and a motor capable of rotating 360 degrees, which not only is portable and has a small size to install shooting equipment such as small video camera and photo camera, but also has a good effect on quickly stabilizing shooting equipment during moving shooting.

The technical solutions of the present invention are as follows:

A handheld triaxial holder with a control stick comprises a handheld part, a fixing device, and three motors which are orthogonally arranged in space. These three motors are an X-axis motor for controlling pitching movement, a Y-axis motor for controlling rolling movement, and a Z-axis motor for controlling the movement about yaw axis. The Z-axis motor has a stator connected with the handheld part. The Z-axis motor is connected with the Y-axis motor via a first connecting arm, the Y-axis motor is connected with the X-axis motor via a second connecting arm, and the X-axis motor is connected with the fixing device.

Being different from the existing devices, the handheld triaxial holder further comprises a control stick attached to the handheld part. The control stick is provided with a navigation key of the control stick and a function button. The movements of the holder about pitch axis and yaw axis may be controlled by means of the navigation key of the control stick. The holder performs a pitch axis rotation when the navigation key of the control stick is pressed upwards or downwards, and it performs a yaw axis rotation when the navigation key of the control stick is pressed leftwards or rightwards. When the function button of the control stick is pressed, the holder may switch in three working modes as below. When the function button is pressed for one time, the holder switches to a yaw-following mode, in which pitch axis and roll axis are locked and yaw axis smoothly rotates based upon the orientation of the device on the hand. When the function button is pressed for successive two times, the holder switches to a yaw and pitch following mode, in which roll axis is locked and yaw axis and pitch axis smoothly rotate based upon the orientation of the device on the hand. When the function button is long-pressed for one second, the holder switches to a locking mode, in which yaw axis, pitch axis and roll axis are all locked.

These three motors may freely rotate 360 degrees. The motor is provided with a slip ring inside its hollow bearing, so that a control line passing through the motor would not rotate along with the motor. In this way, the motors of the holder may freely rotate 360 degrees.

The fixing device is arranged with a port, via which the shooting equipment fixed on the fixing device may be charged and videos may be output from the shooting equipment. Also, two switches are provided for respectively controlling starting and ending of the charging or video output.

The handheld triaxial holder with a control stick according to the present invention has a small size and is portable, and is applicable for shooting equipment such as small video camera and photo camera. The motors are capable of rotating 360 degrees and facilitate multi-angle shooting. The handheld triaxial holder is provided with a control stick for controlling its rotation movement, and has a good effect on quickly stabilizing shooting equipment during moving shooting. It may also output videos and charge the shooting equipment.

BRIEF DESCRIPTION OF THE DRAWINGS

The FIGURE is a schematic view of an embodiment according to the present invention.

In the FIGURE:
1. X-axis motor; 2. fixing device; 3. Y-axis motor; 4. Z-axis motor; 5. control stick; 6. navigation key of the control stick; 7. function button of the control stick; 8. handheld part; 9. switch A; 10. switch B; 11. port.

DETAILED DESCRIPTION OF ILLUSTRATED EMBODIMENTS

The present invention is further explained below in conjunction with figures and embodiments. However, the explanations are not intended to limit the scope of the present invention.

EMBODIMENTS

Referring to the FIGURE, a handheld triaxial holder with a control stick comprises a handheld part 8, a fixing device 2, and three motors which are orthogonally arranged in space. These three motors are an X-axis motor 1 for controlling pitching movement, a Y-axis motor 3 for controlling rolling movement, and a Z-axis motor 4 for controlling the movement about yaw axis. The Z-axis motor 4 has a stator connected with the handheld part 8. The Z-axis motor 4 is connected with the Y-axis motor 3 via a first connecting arm, the Y-axis motor 3 is connected with the X-axis motor 1 via a second connecting arm, and the X-axis motor 1 is connected with the fixing device 2. The handheld triaxial holder further comprises a control stick 5 attached to the handheld part 8. The control stick 5 is provided with a navigation key 6 of the control stick and a function button 7 of the control stick. The movements of the holder about pitch axis and yaw axis may be controlled by means of the navigation key 6 of the control stick. The holder performs a pitch axis rotation when the navigation key 6 of the control stick is pressed upwards or downwards, and it performs a yaw axis rotation when the navigation key 6 of the control stick is pressed leftwards or rightwards. When the function button 7 of the control stick is pressed, the holder may switch in three working modes as below. When the function button 7 is pressed for one time, the holder switches to a yaw-following mode, in which pitch axis and roll axis are locked and yaw axis smoothly rotates based upon the orientation of the device on the hand. When the function button 7 is pressed for successive two times, the holder switches to a yaw and pitch following mode, in which roll axis is locked and yaw axis and pitch axis smoothly rotate based upon the orientation of the device on the hand. When the function button 7 is long-pressed for one second, the holder switches to a locking mode, in which yaw axis, pitch axis and roll axis are all locked.

The above three motors may freely rotate 360 degrees. The motor is provided with a slip ring inside its hollow bearing, so that the control line passing through the motor would not rotate along with the motor. In this way, the motors of the holder may freely rotate 360 degrees.

The fixing device 2 is arranged with a port 11, via which the shooting equipment fixed on the fixing device 2 may be charged and videos may be output from the shooting equipment. Also, two switches, including a switch A 9 and a switch B 10, are provided for respectively controlling starting and ending of the charging or video output.

What is claimed is:

1. A handheld triaxial holder with a control stick, comprising a handheld part, a fixing device and three motors which are orthogonally arranged in space, wherein three motors are an X-axis motor for controlling pitching movement, a Y-axis motor for controlling rolling movement, and an Z-axis motor for controlling the movement about yaw axis, wherein the Z-axis motor has a stator connected with the handheld part, the Z-axis motor is connected with the Y-axis motor via a first connecting arm, the Y-axis motor is connected with the X-axis motor via a second connecting arm, and the fixing device is connected with the X-axis motor, characterized in that: it further comprises a control stick attached to the handheld part, and the control stick is provided with a navigation key of the control stick and a function button of the control stick, and by means of the function button of the control stick the holder is capable of being switched between working modes including: a yaw-following mode, in which pitch axis and roll axis are locked and yaw axis smoothly rotates based upon an orientation of the holder, a yaw and pitch following mode, in which roll axis is locked and yaw axis and pitch axis smoothly rotate based upon an orientation of the holder, and a locking mode, in which yaw axis, pitch axis and roll axis are all locked.

2. The handheld triaxial holder with a control stick according to claim 1, characterized in that: the motor is provided with a slip ring inside its hollow bearing, so that a control line passing through the motor would not rotate along with the motor, so that the three motors of the holder may freely rotate 360 degrees.

3. The handheld triaxial holder with a control stick according to claim 1, characterized in that: the fixing device is arranged with a port, via which shooting equipment fixed on the fixing device may be charged and videos may be output from the shooting equipment, and two switches respectively controlling starting and ending of the charging or video output.

* * * * *